United States Patent
Rauch et al.

[11] Patent Number: 5,821,971
[45] Date of Patent: Oct. 13, 1998

[54] IMAGE REGISTRATION FOR A RASTER OUTPUT SCANNER (ROS) COLOR PRINTER

[75] Inventors: Russell B. Rauch, Pasadena; Anthony Ang, Long Beach; Edward Mycek, La Quinta, all of Calif.

[73] Assignee: Xerox Corporation, Stamford, Conn.

[21] Appl. No.: 673,587

[22] Filed: Jul. 1, 1996

[51] Int. Cl.⁶ ............................ B41J 2/385; G03G 15/01
[52] U.S. Cl. ........................ 347/134; 347/118; 347/153
[58] Field of Search .................................. 347/134, 153, 347/256, 257, 241, 118; 359/204, 216

[56] References Cited

U.S. PATENT DOCUMENTS

| | | | |
|---|---|---|---|
| 4,660,059 | 4/1987 | O'Brien | 347/115 |
| 4,833,503 | 5/1989 | Snelling | 399/231 |
| 5,302,973 | 4/1994 | Costanza et al. | 347/233 |
| 5,412,409 | 5/1995 | Costanza | 347/118 |

*Primary Examiner*—N. Le
*Assistant Examiner*—L. Anderson
*Attorney, Agent, or Firm*—William Propp

[57] ABSTRACT

The present invention is directed to a precise method of registering a plurality of ROS imagers, so as to form sequential registered images on a photoreceptor belt in a single pass. Pairs of belt holes are formed in the photoreceptor belt, outside the image area and outside of the scan width of the ROS imagers. A pair of light sources are incorporated into the post polygon optics of each ROS imager so as to produce a light spot at the photoreceptor surface which will periodically illuminate the holes on the belt. As the leading edge of the belt holes advances into the beams, detectors placed beneath the belt and beneath the exposure station provide signals representing the exposure level of the light source output. The position of a transmissive optical element with no optical power, subsequent to each of said ROS imagers, is adjusted in response to registration error signals generated by said photodetecting means to adjust the position of said scan lines. The detectors produce a current output representative of the exposure level. The current output is converted into page sync signals which are reproducible through each of the imaging stations to produce registration of the first scan line of each image sequence.

7 Claims, 4 Drawing Sheets

IMAGE REGISTRATION FOR A RASTER OUTPUT SCANNER (ROS) COLOR PRINTER

BACKGROUND OF THE INVENTION

The present invention relates to color printers wherein one or more Raster Output Scanners (ROSs) form color images on exposure frames of a photoreceptor belt and, more particularly, to a method and apparatus for forming the color images in registration.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. This laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e. line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or a multiple pass system.

Conventionally, the ROS includes a diode or gas laser for generating a coherent beam of radiation; a modulator for modulating the laser output in accordance with an input video signal; and a multifaceted polygon scanner for scanning the modulated laser beam output line by line, across the surface of the photoreceptor to form the latent image. Also included in the ROS are various optical components to collimate, expand, focus and align the modulated scanning beams. These optical components are fixedly mounted within a housing frame, which is positioned within a printer machine frame, so that the modulated and shaped scanning beams emerging from an output window in the housing are directed in a scan line which is perpendicular to the photoreceptor surface. The lines will be formed in parallel across the surface of the photoreceptor belt. The belt should be aligned so that these parallel lines are formed perpendicular to the direction of belt travel.

In a color xerographic ROS printer, a plurality of ROS units are positioned adjacent a photoreceptor belt surface and selectively energized to create successive image exposures until a series of image frames, each of a separate color image, is formed. For full color, four imagers are used, one for each of the three basic colors and a fourth for black images. Each image is developed in overlying registration with preceding images and a composite color image is transferred to an output sheet. Each image must be registered in both the photoreceptor process direction and in the direction perpendicular to the process direction (referred to as the fast scan or lateral direction). One registration technique is to form a plurality of holes in non-image areas of the belt at some predetermined distance upstream from an associated image exposure frame. The ROS beam is positioned so that each line sweep, or scan, begins and ends in non-image areas of the photoreceptor so as to scan across the belt holes as the belt advances into an exposure zone. Each ROS has an associated pair of sensors positioned beneath the belt. These sensors detect the ROS scanning beams as it is swept across the leading edge of a belt hole and provides output signals which are used for registration purposes. This type of ROS registration technique is generally disclosed in U.S. Pat. No. 5,302,973, commonly assigned as the present application and hereby incorporated by reference.

A major difficulty in registering the images in a ROS belt hole type detection system lies in the scanning nature of the ROS device; the spot which is swept across the photoreceptor moves at a very high rate (60,000 ips) which reduces the time the beam illuminates the photodetector through the belt hole. Since the photodetector typically has a width of only a few millimeters, the ROS beam is only sensed by the photodetector for a short time duration measured in microseconds. It has proven difficult to design detection circuits to achieve the required registration accuracy of 5–10 microns.

One registration technique uses two separate light sources to form two light beams outside the scanning width of the ROS beams to illuminate the belt holes on the photoreceptor, as taught in U.S. Pat. No. 5,412,409, commonly assigned as the present application and hereby incorporated by reference. One of the later optical components, such as one of the fΘ lens or the wobble correction mirror of the ROS is rotated to create the required rotation of the projected scan line. However, the lenses and mirrors of the ROS have optical power in at least one direction, usually both directions. Some optical elements, such as toroids, have optical power that vary with position of the beam on the surface of the element. Furthermore, a ROS is a precision optical system. With the obvious exception of the rotating polygon mirror, the optical components of the ROS should ideally be stationary and fixed. And these optical components are in the focal plane of the ROS.

SUMMARY OF THE INVENTION

There is still a need for a more accurate method of registering the color image in a ROS-type printing system. The present invention is directed to a registration technique which does not rely on the light from the ROS beam to be sensed by a photodetector. Instead, a separate dedicated light source is provided that does not move in the fast scan direction, as is the case with the ROS beams sweeping across the photoreceptor. Two separate light sources, which are LEDs in a preferred embodiment, are located in the ROS optical system so as to form two light beams outside the scanning width of the ROS beams. The beams provide a continuous light flux along areas of the photoreceptor and "look" for the belt holes formed on the belt. When the belt holes are illuminated by the light sources, the photodetectors on the other side of the belt are illuminated and provide a continuous signal which simplifies the associated amplifier design and allows for more accurate sensing of the belt hole locations. In a preferred embodiment, the output window, a transmissive optical component with no optical power, subsequent to the ROS, is selected to be movable by the actuator, so as to change the offset of the projected scan line in the process direction. More particularly, the present invention relates to an imaging system for forming multiple image exposures on exposure frames of a photoconductive member including:

a photoreceptor belt having a plurality of image exposure frames along its circumference, said belt having at least a first and second hole on opposite sides of the belt width and outside of the exposure frames, a plurality of ROS imagers, each ROS imager associated with the formation of one of said image exposure frames, each imager forming a plurality of projected scan lines in a fast scan direction across the belt width, said scan lines beginning and ending at points within an image exposure frame, a first and second light source opposed from one surface of the photoreceptor belt for illuminating said first and second belt holes, first and second detecting means associated with each of said imagers, said detecting means opposed from the other surface of the photoreceptor for sensing the light from said first and second light sources through said belt holes and generating signals representing said detection, and circuit means to amplify said detecting means output signals and to generate image registration correction signals to adjust the position of a transmissive optical element with no optical power, subsequent to each of said ROS imagers, to adjust the position of said scan line to correct for process registration errors.

DETAILED DESCRIPTION OF THE INVENTION

Figure 1:
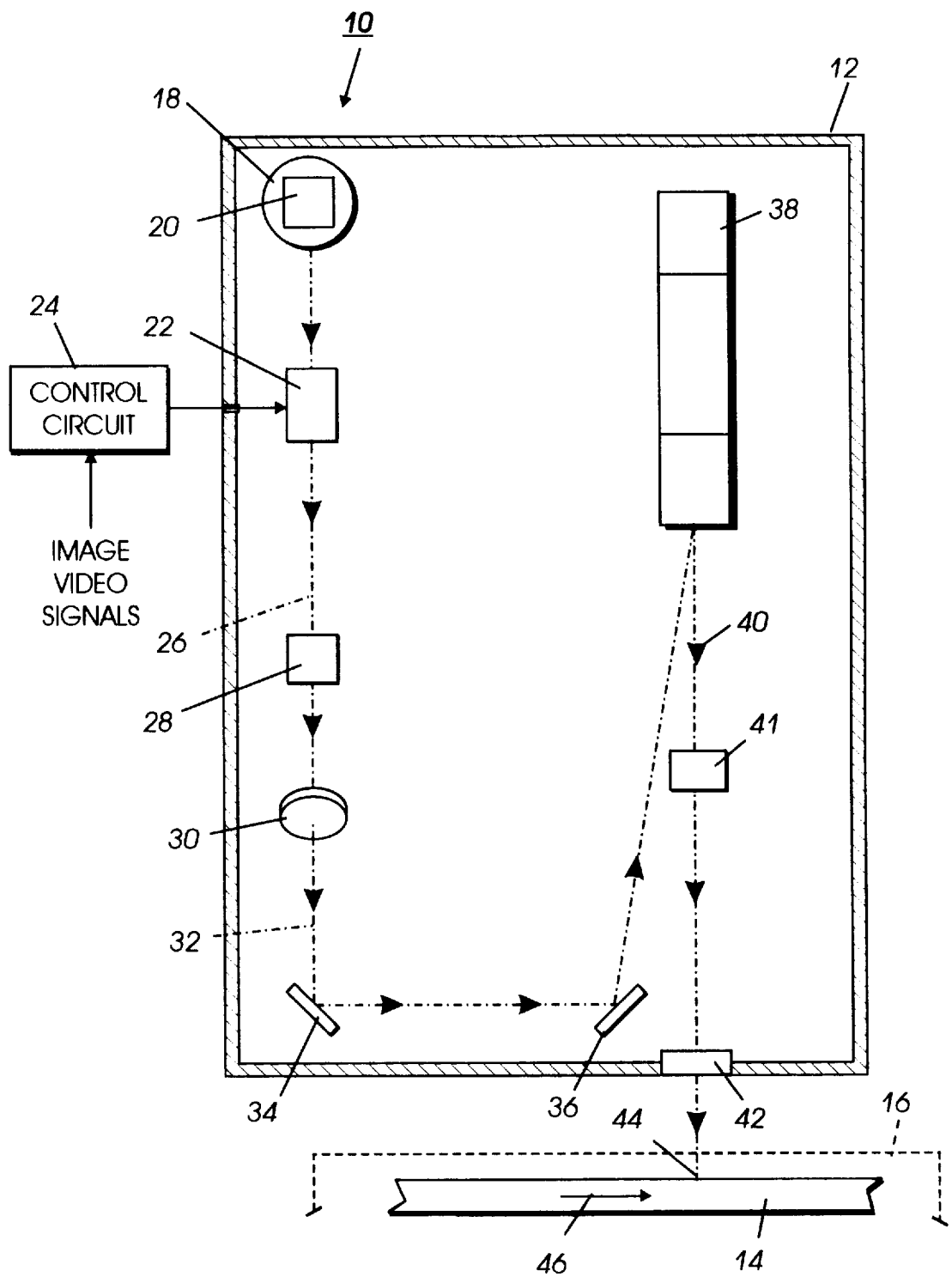
FIG. 1 is an interior sectional view of the ROS housing and the optical components contained therein.

Referring now to FIG. 1, the Raster Output Scanner (ROS) unit 10 consists of a modular housing 12, within which are mounted the optical components which generate the scan lines at the surface of the photoreceptor 14, housed in print module 16. These components Include a laser 18 which generates a collimated beam of monochromatic light. The monochromatic light beam is reflected by first mirror 20 onto modulator 22, the light beam being modulated in conformance with the information contained in the video signal sent from image output control circuit 24. Modulator 22 may be any suitable acousto-optic or electro-optical modulator for recording the video information in form of a modulated light beam, at the output of the modulator. By means of the modulator, the information within the video signal is represented by the modulated light beam 26. Light beam 26 is reflected by second mirror 28 and is incident on imaging optical system 30. Imaging optical system 30 produces a beam 32, which is reflected by third and fourth mirrors 34 and 36, and impinges upon a plurality of contiguous facets of scanning polygon 38. The beams 40 reflected from polygon 38 are directed through post-polygon conditioning optics 41, and then through output window 42 to form successive, parallel output raster lines 44 at photoreceptor 14, moving in the direction of arrow 46.

Figure 2:
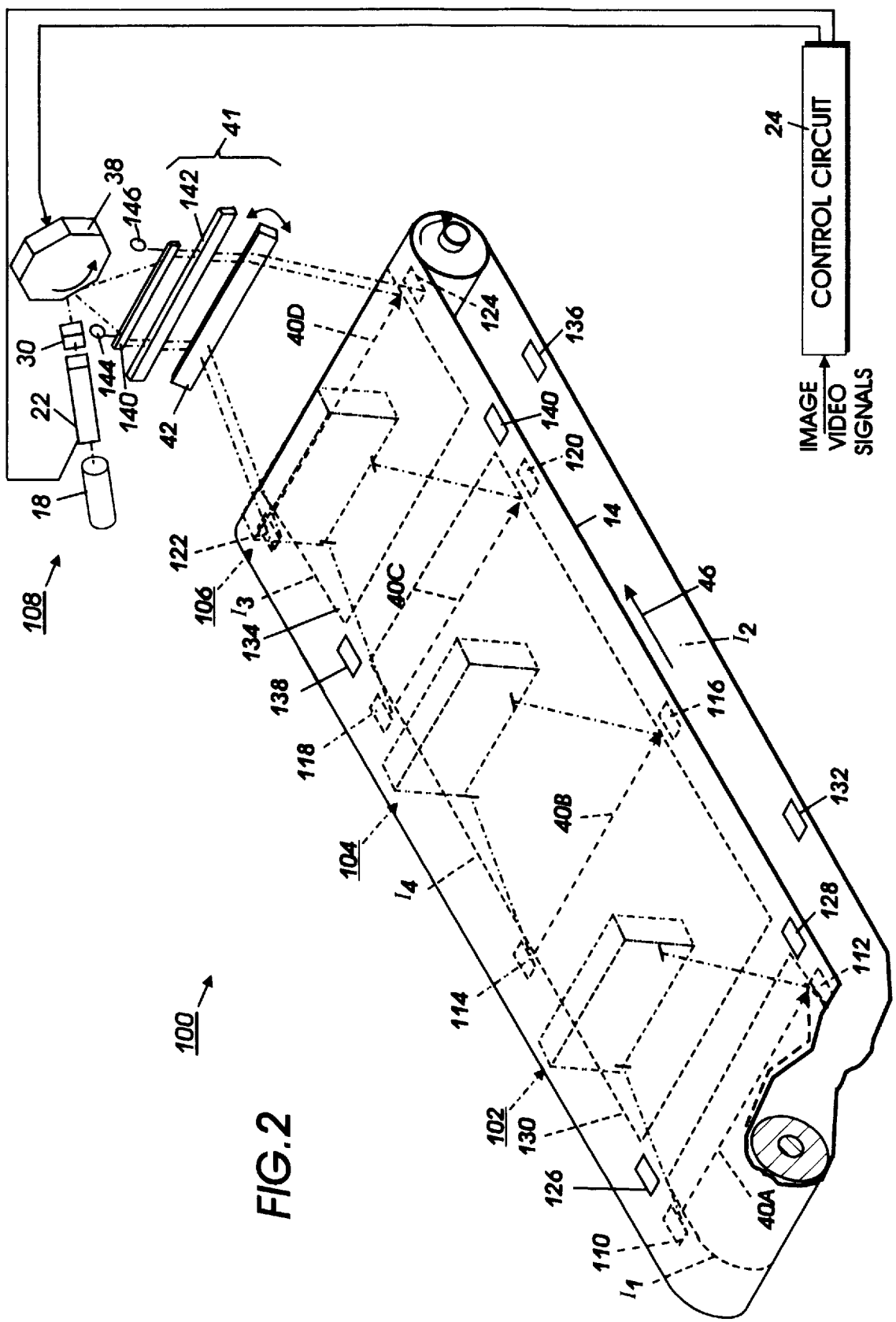
FIG. 2 shows a ROS color printer incorporating the improved hole detection and registration mechanism of the present invention.

FIG. 2 shows a single pass, ROS color printing system 100 having four ROS imagers 102, 104, 106, 108 positioned in an image forming relation with a photoreceptor 14 (a photoreceptor belt in this illustrative example), driven in the process direction, indicated by the arrow 46. ROS imager 108 is shown in detail with all the optical elements which produce the scanning beam 40D. Each of the other ROS imagers 102, 104, 106, 108 have identical optical systems. Operation of these imagers is described in detail in, for example, in the previously cited U.S. Pat. No. 5,302,973. The length of the belt 14 is designed to accommodate four A4 (8½×11) pitches or exposure image areas, $I_1$–$I_4$ represented by dashed line rectangles. Image areas $I_1$–$I_4$ each comprise an image exposure frame; it is understood that other numbers of image frames may be imaged; e.g. two frames for an A3 (11×17) system. Each frame $I_1$–$I_4$ is associated with a process color image which is formed during one belt rotation. Upstream of each of the ROS imagers is a charging station (not shown) which places a predetermined electrical charge on the surface of belt 14. As each of the image exposure areas $I_1$–$I_4$ reaches a transverse start-of-scan line for each ROS imager, represented by lines 40a–40d, the area is progressively exposed on closely spaced successive transverse raster lines. Each image is exposed successively by the ROS imagers. Each ROS imager has a start-of-scan (SOS) sensor and an end-of-scan (EOS) sensor, conventional in the art. Each imager also has a pair of photodetectors positioned beneath the belt, but in alignment with the ends of the scan line. Thus, ROS imager 102 has a pair of photodetectors 110, 112, positioned outside of the scan length of scan line 40A; ROS imager 104 has detectors 114, 116, positioned outside of the scan length of scan line 40B; ROS imager 106 has detectors 118, 120, positioned outside of the scan length of scan line 40C and ROS imager 108 has detectors 122, 124, positioned outside of the scan length of scan line 40D.

Belt 14 has been formed with four sets of belt holes, each set associated with detection of the leading edge of an associated image exposure frame just downstream from the direction of belt motion (process direction). Thus, belt holes 126, 128 are formed a predetermined distance before the leading edge of image frame $I_1$; holes 130, 132 before image frame 12 (not shown but on the bottom surface of the belt); holes 134, 136 before the leading edge of image frame $I_3$ and holes 138, 140 before the leading edge of image frame $I_4$.

Downstream from each ROS imager, a development station (not shown) develops the latent image formed by the preceding ROS. The developed frame is recharged by a charging station associated with the next downstream imager and the next color image is formed over the previously developed image. It is understood that each exposure frame; e.g. $I_1$, is successively exposed at each downstream ROS station, with a composite color image being formed and transferred to an output sheet at a transfer station. Details of charge, development and transfer xerographic stations in a multiple exposure single pass system are disclosed, for example, in U.S. Pat. Nos. 4,660,059 and 4,833,503, whose contents are hereby incorporated by reference. The charge, development, and transfer stations are conventional in the art.

Figure 3:
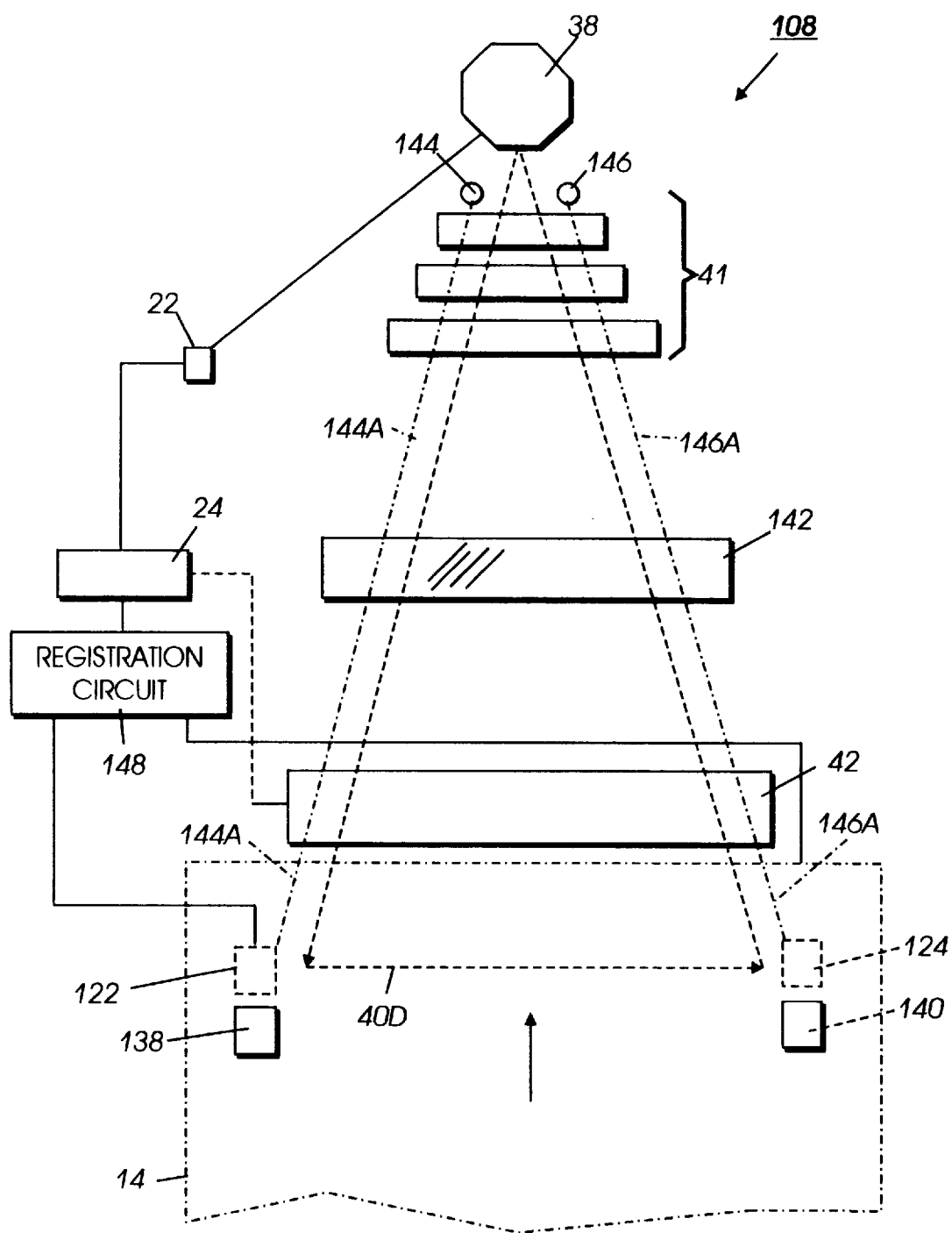
FIG. 3 shows an unfolded schematic of the ROS imager optical system of FIG. 2 showing the location of the light sources used for the belt hole detection.

The components of ROS unit 10 of imager 108 are shown in detail in FIGS. 1 and 3. It is understood that units 102, 104, 106 are similar in construction. ROS 10 in FIG. 3, in a simplified view without the folding mirrors and ROS housing of FIG. 1, is a compact system which comprises a gas laser or laser diode 18, which generates a collimated beam of monochromatic light. The light beam is modulated by modulator 22 in accordance with input video image signals processed through control circuit 24. The laser output is directed through a imaging optical system 30 which provides beam expansion of the laser output. The collimated output from system 30 is focused onto facets of rotating polygon 38. The reflected beam from polygon 38 facets is focused in the fast scan direction at the photoreceptor surface 14 forming the scan lines 44. The beam is focused through post-polygon conditioning optics 41 of an fΘ lens 140 to linearize the beam and through cylindrical lens 142, which focuses in the sagittal direction. The beams are directed through output window 42 in a scan line onto the photoreceptor surface.

In accordance with the present invention, a pair of light sources 144, 146 are located in the post polygon optical system between polygon 38 and lens 42. FIG. 3 shows a schematic of the ROS 10 optics in an unfolded configuration. Referring to FIGS. 2 and 3, the light sources generate output beams 144A, 146A, which are located in parallel paths to the ROS beam forming output scan line 40D, but outside of the scanning width. The beams will hereafter be referred to "steering" beams. The steering beams 144A, 146A illuminate the surface of the belt 14 in areas outside the scan length and aligned with the portion of the belt where holes 126 to 140 have been formed. It is understood that ROS units 102, 104, 106 have sets of light sources similarly positioned with respect to their associated polygons. These light sources, which are small LEDs in a preferred embodiment, are accurately positioned during initial system alignment with regard to the scanning beams of each ROS. The position of the steering beams, on either side of the scanning beam, are measured in both the lateral (fast scan) and process (slow scan) direction. The relative position of the steering beam to the scan lines 40a–40d will be unique to each beam in each ROS and are entered into machine logic contained in control circuit 24. Once the relative position is measured, all motion of the scanning beams will be followed by the steering beams.

Referring again to FIGS. 2 and 3, an operational sequence will be described to demonstrate the utility and function of the steering beams in obtaining registration of the color images formed by the ROS units. FIG. 3 shows system 108 in a position where frame $I_4$ is approaching ROS station 10. It is assumed that three color images have been previously exposed and developed on frame $I_4$ by ROS imagers 102, 104, 106. As frame $I_4$ approaches ROS imager 100, holes 138, 140 will advance into the flux from steering beam 144A, 146A, respectively. Sensors 122 and 124 are illuminated and generate output signals which are sent to a registration circuit 148. Circuit 148, as is known from the prior art referenced supra, contains amplification and conversion circuitry which will generate error signals to correct misregistration in the process and scan directions. Appropriate signals are sent to circuit 24 to correct the output of laser diode 18 for lateral and process direction registration errors and also to enable the line sync signals for the first line of image information to be formed on image frame $I_4$. Signals are sent to output window 42 to adjust the position and/or tilt to correct for process errors. These error signals thus correct for any registration error which may have occurred since the original alignment and ensure that the first line of image information is registered with the first scan line of image frame $I_4$. The full image is then written by successive scan lines from ROS imager 108 and the final image developed and the composite image transferred.

Figure 4:
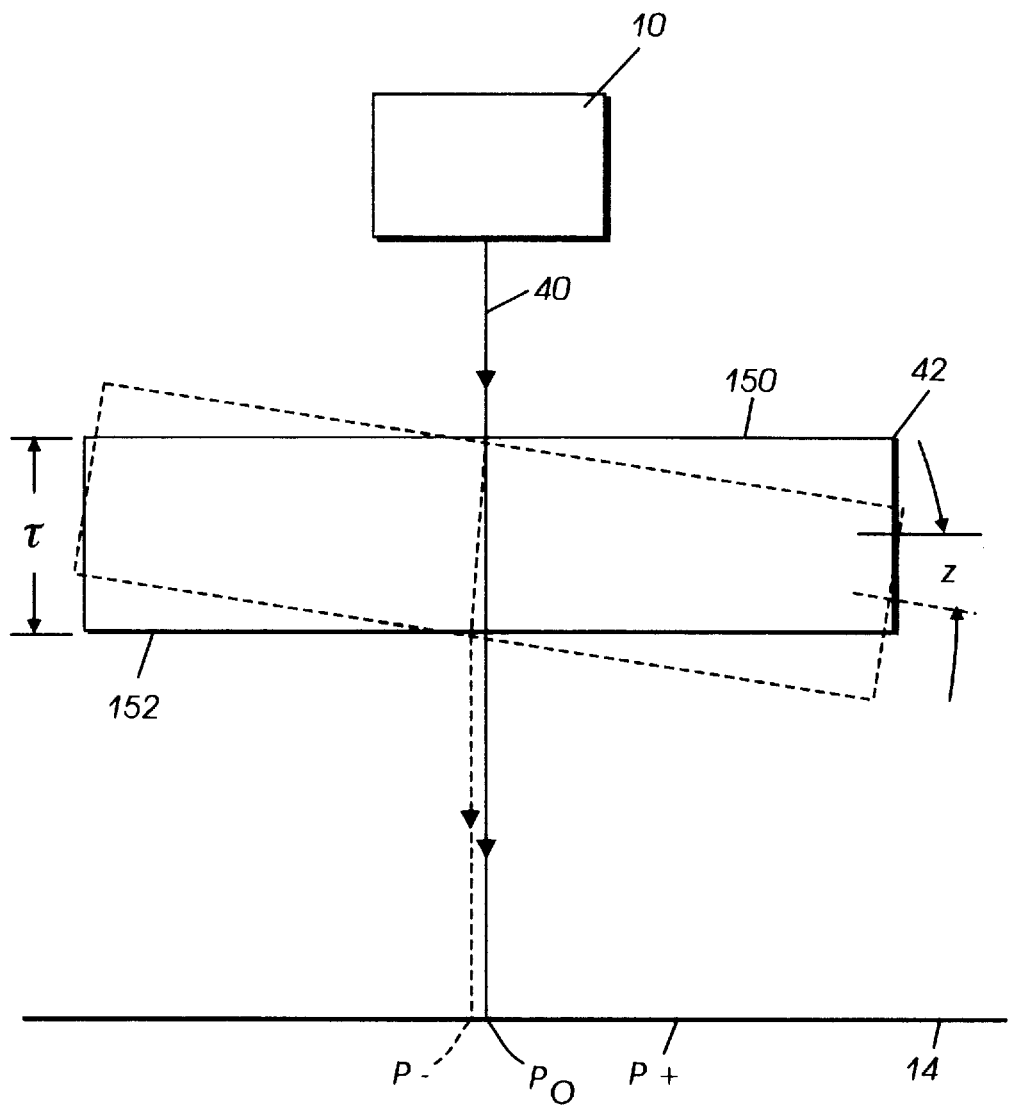
FIG. 4 is a schematic view of the rotatable output window of the ROS housing.

More specifically, as seen in FIG. 4, the output window 42 is formed of an optically transmissive material, such as plastic or glass, with an index of refraction, n. The input surface 150 and output surface 152 of the output window 42 are parallel and, thus, the window has an uniform thickness, t. The output window is in the optical path of the printer system, subsequent to the ROS unit 10 but prior to the photoreceptor 14.

This rotational motion is accomplished by applying signals to an actuator such as stepper motor. Stepper motor may have, for example, a 50:1 gear reduction and approximately a 28 thread/inch screw. This provides 1 micron motion/motor step resolution. The stepper motor transmits the correction to the output window of the ROS system to cause the output window to rotate in such a way as to rotate the projected scan line to compensate for the detected error.

As noted, the stepper motor controllably rotates the output window in such a way as to translate the projected scan line to compensate for the detected error. In the normal, nominal position, the light beam 40 will pass straight through the output window, perpendicular to the input surface 150 and output surface 152 to position $P_0$ on the photoreceptor. Based on the law of refraction applied to each surface of the window, rotating the output window 42 increases the optical path of the light beam through the optical window. Accordingly, the exiting light beam is translated relative to the input light beam. The light beam exits parallel to the input beam but offset and the position of the beam on the photoreceptor is altered. The light beam is displaced from the nominal position $P_0$ to position $P_-$ as a result of a controlled angular rotation of the output window by the angle z.

The displacement of the beam can be calculated from equations (1) and (2):

$$d(z)=t\sin(z)[1-\cos(z)/n\cos(z_1)] \qquad \text{Equation 1}$$

where $d(z)$ is the displacement of the beam along the photoreceptor, $t$ is the thickness of the window, $n$ is the index of refraction of the output window and $z_1$ is defined in equation 2.

$$z_1=\sin^{-1}[(n\sin(z))] \qquad \text{Equation 2}$$

The displacement can likewise be made to position P+ by rotating the output window by the angle in the opposite direction.

The above alignment procedure is repeated for each of the remaining ROS systems, advancing the same aperture pair into alignment with the projected scan line formed by each of these systems. Each ROS is then aligned in the same manner, each ROS having an associated sensor array and stepper motor, which rotates the same selected optical component. At the end of the initial alignment, all ROS systems are aligned with respect to the aperture pair, thereby enabling lead edge registration by controlling the registration at the beginning of each image area. In operation, as the lead edge of apertures are detected by the associated sensors, a signal will be generated within circuit 24 and a write signal applied by control circuit 24 to each ROS after a finite time interval. The time interval will be the same for all the ROS systems, since the exact position of each scan line is being sensed.

The output window is not an optical component of the ROS. The output window does not have optical power. The output window is not in the focal plane of the ROS. The output window is a standard component of the ROS housing and thus is not an additional optical component of the printer system.

Although the invention has been shown in a single pass embodiment, it can also be practiced in a multi-ROS high-light color system where two single ROS imagers; e.g. in FIG. 2, ROS imager 108 being used to form each image.

In the preferred embodiment, light sources 144, 146 are small LEDs. These LEDs may require a plastic lens or "grin" in the optical path to produce a focused spot at the belt surface to provide a sharper transition at the edge of the belt holes. The preferred location for sources 144, 146 is between the post-polygon optics and the polygon, since, for this location, both the steering and scanning beams are moved in unison. Also, with close placement of the light sources to the polygon, errors due to the motion of the post-polygon optics 41 (fΘ lens 140 and cylindrical lens 142) will be eliminated. These errors typically occur when thermal or mechanical loads cause a movement in these optical components, creating shifts in the positions of the scan lines. If the light sources are located upstream of these components, the steering beams will be shifted a like amount, eliminating any relative position errors.

In summary, the present invention is seen to provide a method for illuminating registration sensors through belt holes by use of a nonscanning beam which relaxes the need for high speed, high accuracy amplifiers required in the prior art systems. The ROS imagers 102 to 108 can be operated with a shorter scan width since the beams do not have to sweep across the opposed belt holes outside of the image areas.

While the invention has been described with reference to the structures disclosed, it is not confined to the details set forth, but is intended to cover such modifications or changes as they come within the scope of the following claims.

What is claimed is:

1. An imaging system for forming multiple image exposures on exposure frames of a photoconductive member including:

a photoreceptor belt having a plurality of image exposure frames along the belt circumference, said belt having at least a first and second hole on opposite sides of a width of said belt and outside of the exposure frames, a plurality of ROS imagers, each ROS imager associated with the formation of one of said image exposure frames, each imager forming a plurality of projected scan lines in a fast scan direction across the belt width, said scan lines beginning and ending at points within an image exposure frame, a first and second light source opposed from one surface of the photoreceptor belt for illuminating said first and second belt hole, first and second detecting means associated with each of said imagers, said detecting means opposed from the other surface of the photoreceptor belt for sensing the light from said first and second light source through said belt holes and generating signals representing said detection, a transmissive optical element with no optical power subsequent to each of said ROS imagers and circuit means to amplify said first and second detecting means output signals and to generate image registration correction signals to adjust the position of said transmissive optical element with no optical power, and to adjust the position of said scan lines to correct for process registration errors.

2. The imaging system of claim 1 wherein said plurality of ROS imagers form said plurality of image exposures in a single pass of the photoreceptor belt.

3. The imaging system of claim 1 wherein said first and second light source include means for focusing the light source outputs as spots on said one surface the photoreceptor belt.

4. The imaging system of claim 1 wherein said first and second light source create steering beams which are directed along a path parallel to and outside of image scan beams defining the beginning and end points of the scan lines.

5. The imaging system of claim 1 wherein each ROS imager includes a laser light source for producing an output beam, optical means for modulating and shaping the output beam and directing said modulated, shaped beam towards facets of a rotating polygon, post-polygon optical means for scanning beams reflected from said polygon to said one surface of said photoreceptor belt to form said scan lines and wherein said first and second light source are located between the polygon and said post-polygon optical means.

6. The imaging system of claim 5 wherein said transmissive optical element is an output window of each of said ROS imagers.

7. A method for forming registered multiple image exposures on a photoreceptor belt moving in a process direction including the steps of:

forming at least a first and second hole in the belt in non-image areas at opposite sides of a width of said belt, positioning at least one Raster Output Scanner (ROS) imager so as to form said registered image exposures, said ROS imager forming a plurality of scan lines in a fast scan direction across the width of said belt by reflecting modulated beams from the multi-faceted surface of a rotating polygon, positioning a pair of light sources between the polygon and a belt surface, said light sources generating output steering beams which are adjacent to and outside the path of the scanning beams, moving the belt until the steering beams are detected through said first and second belt hole by photodetecting means positioned beneath said ROS imager, adjusting the position of a transmissive optical element with no optical power in response to registration error signals generated by said photodetecting means to adjust the position of said scan lines.

* * * * *